United States Patent [19]
Kanwal

[11] Patent Number: 5,868,049
[45] Date of Patent: Feb. 9, 1999

[54] SCREW AND DRIVER SYSTEM

[76] Inventor: Manmohan S. Kanwal, 215 Castlebrook Road NE, Calgary, Alberta, Canada, T3J 2C5

[21] Appl. No.: 775,725

[22] Filed: Dec. 31, 1996

[51] Int. Cl.[6] ..................................................... B25B 23/00
[52] U.S. Cl. ................................................................ 81/460
[58] Field of Search ..................... 411/407, 403, 411/404, 405, 406; 81/436, 451, 460

[56] References Cited

U.S. PATENT DOCUMENTS

| | | | |
|---|---|---|---|
| 2,397,216 | 3/1946 | Stellin | 411/404 |
| 3,872,904 | 3/1975 | Barlow | 411/403 |
| 4,538,486 | 9/1985 | Lutrat | 411/407 |
| 5,438,895 | 8/1995 | Bassell et al. | 81/436 |

*Primary Examiner*—David A. Scherbel
*Assistant Examiner*—Benjamin M. Halpern

[57] ABSTRACT

A new Screw & Driver System for providing a way for releasably securing a driver to the head of a screw such that the driver cannot be lifted straight up and out of the screw. The inventive device includes a screw and a driver therefore. The screw has a head with an hourglass-shaped driver receiving cavity. The hourglass-shaped driver receiving cavity includes a middle section and a pair of opposed wedge-shaped sections extending from the middle section. The pair of opposed wedge-shaped sections have undercut sidewalls. The driver includes a tool element having an hourglass-shaped end wherein the hourglass-shaped end of the tool element has shoulder surfaces which cooperably engage and lockingly mate with the undercut sidewalls of the pair of opposed wedge-shaped sections when the driver and the screw are in working engagement.

9 Claims, 6 Drawing Sheets

SCREW AND DRIVER SYSTEM

BACKGROUND OF THE INVENTION

1. Field of the Invention

The present invention relates to screws and screwdrivers and more particularly pertains to a new Screw & Driver System for providing a means of "locking" the driver to the head of the screw so that the driver cannot be lifted straight up and out.

2. Description of the Prior Art

The use of screws and screwdrivers is known in the prior art. More specifically, screws and screwdrivers heretofore devised and utilized are known to consist basically of familiar, expected and obvious structural configurations, notwithstanding the myriad of designs encompassed by the crowded prior art which have been developed for the fulfillment of countless objectives and requirements.

Known prior art screws and screwdrivers include U.S. Pat. No. 3,695,321; U.S. Pat. No. 4,311,071; U.S. Pat. No. 5,120,173; U.S. Pat. No. 5,269,209; U.S. Pat. No. 5,358,368; and U.S. Pat. No. 3,456,548.

While these devices fulfill their respective, particular objectives and requirements, the aforementioned patents do not disclose a new Screw & Driver System. The inventive device includes a screw and a driver therefore.

In these respects, the Screw & Driver System according to the present invention substantially departs from the conventional concepts and designs of the prior art, and in so doing provides an apparatus primarily developed for the purpose of providing a means of "locking" the driver to the head of the screw so that the driver cannot be lifted straight up and out.

SUMMARY OF THE INVENTION

In view of the foregoing disadvantages inherent in the known types of screws and screwdrivers now present in the prior art, the present invention provides a new Screw & Driver System construction wherein the same can be utilized for providing a means of "locking" the driver to the head of the screw so that the driver cannot be lifted straight up and out.

The general purpose of the present invention, which will be described subsequently in greater detail, is to provide a new Screw & Driver System apparatus and method which has many of the advantages of the screws and screwdrivers mentioned heretofore and many novel features that result in a new Screw & Driver System which is not anticipated, rendered obvious, suggested, or even implied by any of the prior art screws and screwdrivers, either alone or in any combination thereof.

To attain this, the present invention generally comprises a screw and a driver therefore.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Screw & Driver System apparatus and method which has many of the advantages of the screws and screwdrivers mentioned heretofore and many novel features that result in a new Screw & Driver System which is not anticipated, rendered obvious, suggested, or even implied by any of the prior art screws and screwdrivers, either alone or in any combination thereof.

It is another object of the present invention to provide a new Screw & Driver System which may be easily and efficiently manufactured and marketed.

It is a further object of the present invention to provide a new Screw & Driver System which is of a durable and reliable construction.

An even further object of the present invention is to provide a new Screw & Driver System which is susceptible of a low cost of manufacture with regard to both materials and labor, and which accordingly is then susceptible of low prices of sale to the consuming public, thereby making such Screw & Driver System economically available to the buying public.

Still yet another object of the present invention is to provide a new Screw & Driver System which provides in the apparatuses and methods of the prior art some of the advantages thereof, while simultaneously overcoming some of the disadvantages normally associated therewith.

Still another object of the present invention is to provide a new Screw & Driver System for providing a means of "locking" the driver to the head of the screw so that the driver cannot be lifted straight up and out.

Yet another object of the present invention is to provide a new Screw & Driver System which includes a screw and a driver therefore.

Still yet another object of the present invention is to provide a new Screw & Driver System that creates a tighter and more secure fit between the screw and the driver so that the end of the driver will not slip out of the head of the screw while tightening or loosening the screw, thus also preventing the head of the screw from becoming stripped.

Even still another object of the present invention is to provide a new Screw & Driver System that allows you to hold the screw with the driver and position the screw in a hole more easily.

Even still another object of the present invention is to provide a new Screw & Driver System that allows you to pull and retrieve the screw out of a hole without dropping the screw.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 12 thereof, a new Screw & Driver System embodying the principles and concepts of the present invention and generally designated by the reference numeral 10 will be described.

Figure 1:
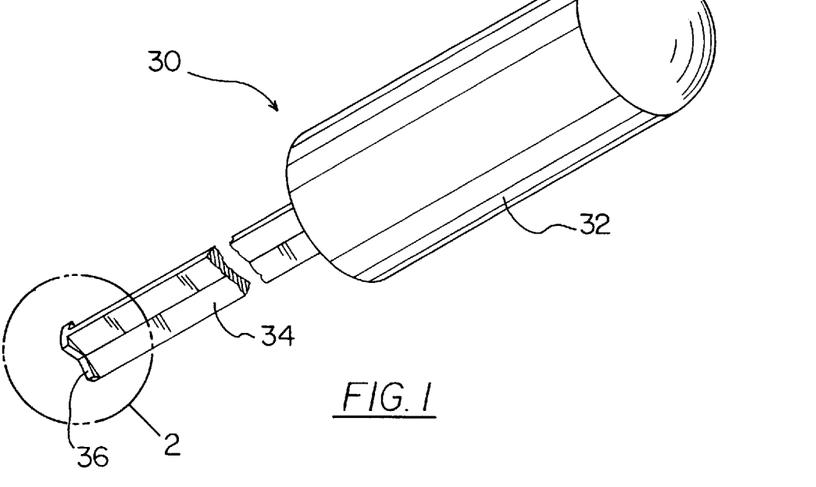
FIG. 1 is an isometric illustration of the driver for a new Screw & Driver System of the present invention.
Figure 2:
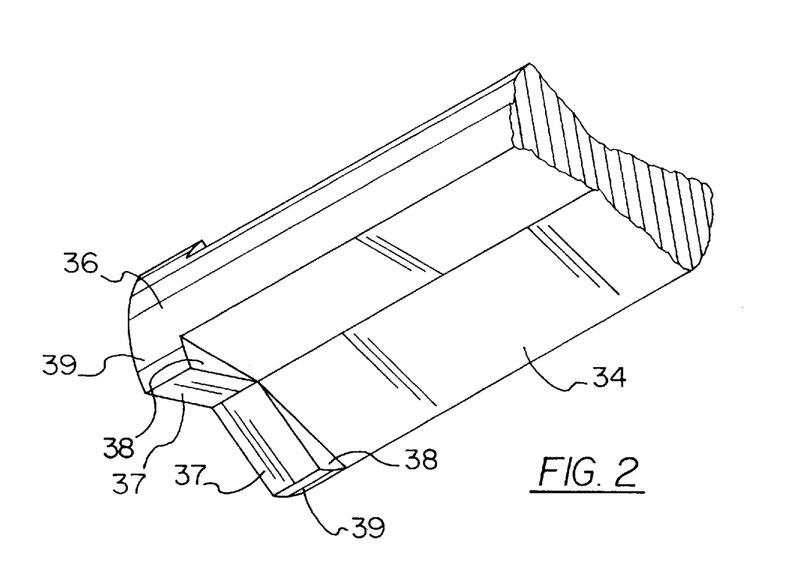
FIG. 2 is an enlarged isometric illustration of the tool element and end of the driver of the present invention.
Figure 3:
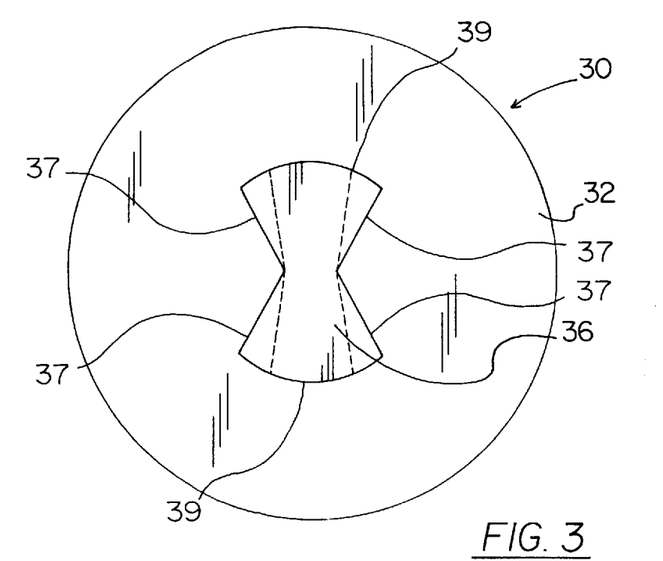
FIG. 3 is an end view of the driver of the present invention.
Figure 4:
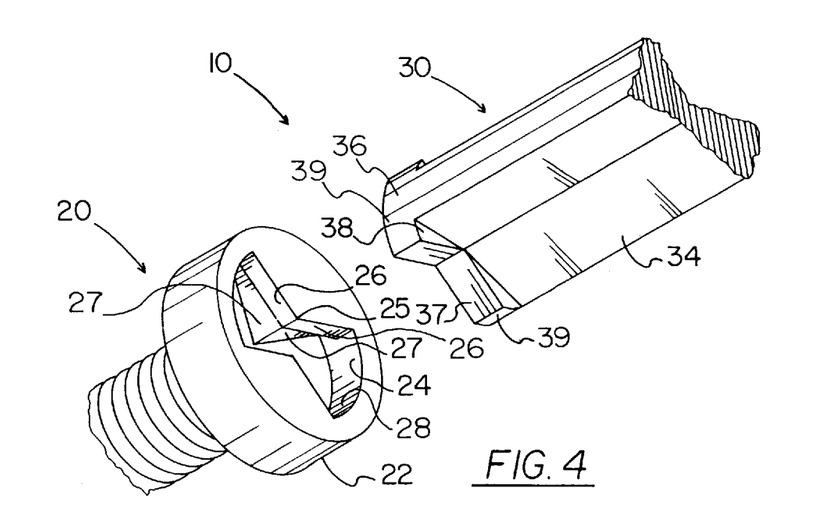
FIG. 4 is an isometric illustration of the mating screw head and the driver of the present invention.
Figure 5:
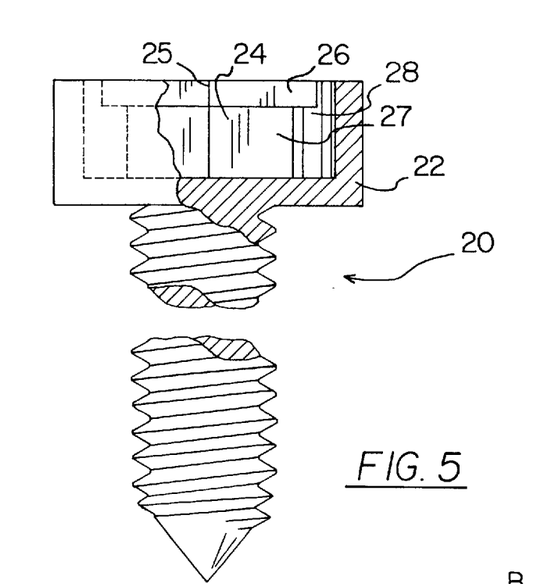
FIG. 5 is side view of the screw, including a partial cross sectional view of the screw head of the present invention.
Figure 6:
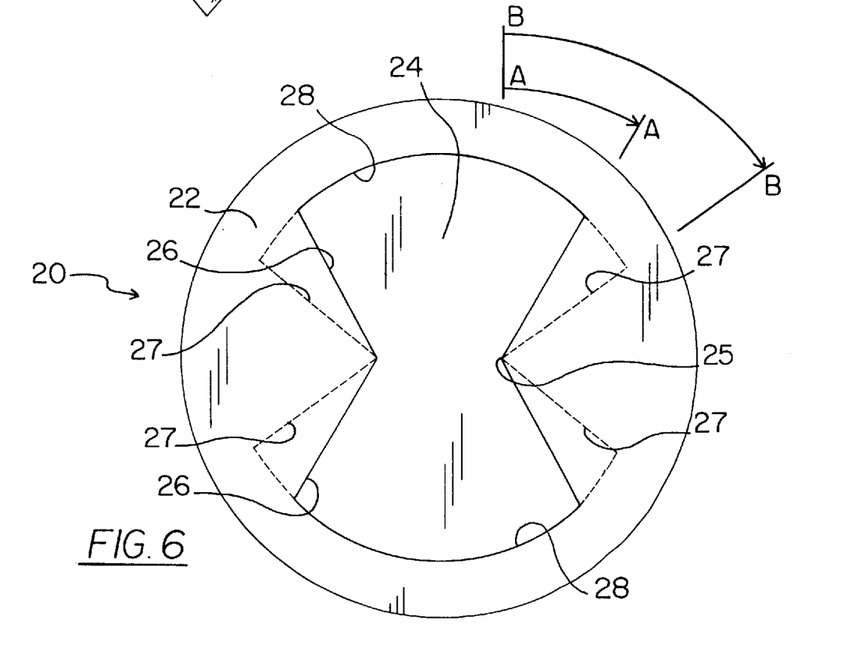
FIG. 6 is a top view of the screw head of the present invention.
Figure 7:
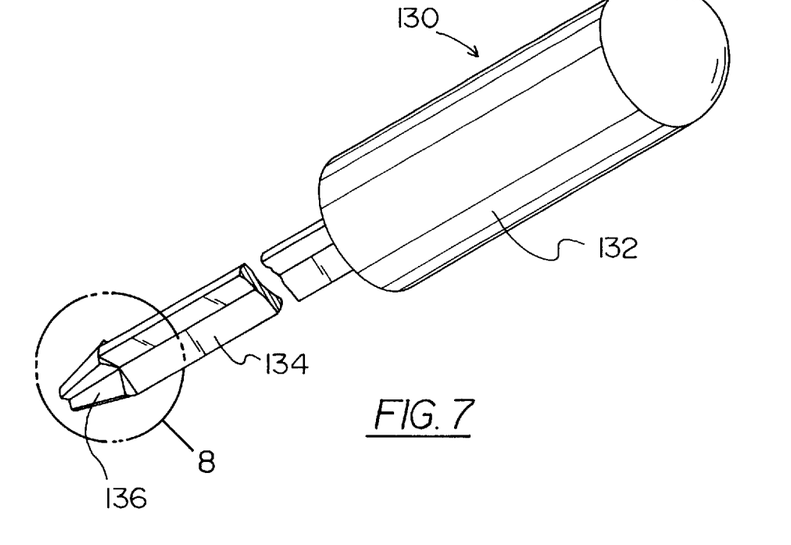
FIG. 7 is an isometric illustration of the driver of a second embodiment of the present invention.

More specifically, it will be noted that the Screw & Driver System 10 comprises a screw 20 and a driver 30 therefore. As best illustrated in FIGS. 4 through 6, the screw 20 has a head 22 with an hourglass-shaped driver receiving cavity 24. The hourglass-shaped driver receiving cavity 24 includes a middle section 25 and a pair of opposed wedge-shaped sections 26 extending from the middle section 25. The pair of opposed wedge-shaped sections 26 expand radially outward from the middle section 25 at a first angle A. The pair of opposed wedge-shaped sections 26 each have undercut sidewalls 27 and open sidewalls 28. The undercut sidewalls 27 expand radially outward from the middle section 25 at a second angle B which is greater than the first angle A, thereby creating "neutral" and "locked-in" positions.

As best illustrated in FIGS. 1 through 4, the driver 30 comprises a handle 32 and a tool element 34 extending from the handle 32. The tool element 34 has an hourglass-shaped end 36 distal from the handle 32. The hourglass-shaped end 36 of the tool element 34 has an inner shoulder surface 37, an upper shoulder surface 38, and an outer shoulder surface 39.

The hourglass-shaped end 36 cooperably engages the hourglass-shaped driver receiving cavity 24 of the head 22 of the screw 20 whereby the outer shoulder surface 39 abuts the open sidewalls 28 when the driver 30 and the screw 20 are in a "neutral" working engagement. The inner shoulder surface 37 and the upper shoulder surface 38 cooperably engage and lockingly mate with the undercut sidewalls 27 of the pair of opposed wedge-shaped sections 26 when the driver 30 and the screw 20 are in a "locked-in" working engagement, thereby securing the driver 30 to the head 22 of the screw 20. The hourglass-shaped driver receiving cavity 24 of the head 22 of the screw 20 and the hourglass-shaped end 36 of the tool element 34 can be formed in the shape of an "X" or a "Figure 8."

Figure 10:
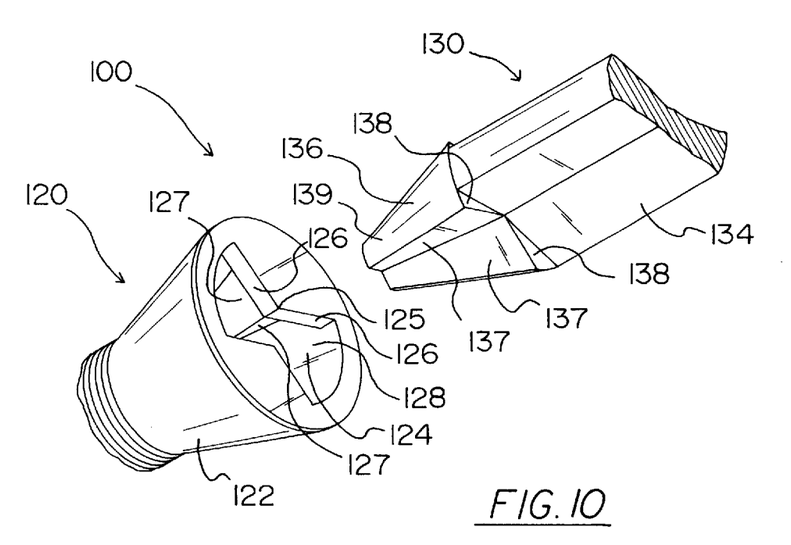
FIG. 10 is an isometric illustration of the mating screw head and the driver of the second embodiment of the present invention.
Figure 11:
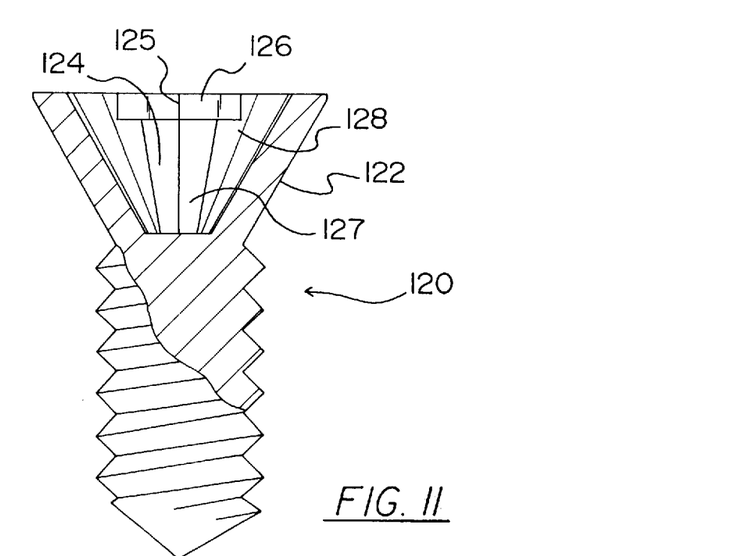
FIG. 11 is side view of the screw, including a partial cross sectional view of the screw head of the second embodiment of the present invention.
Figure 12:
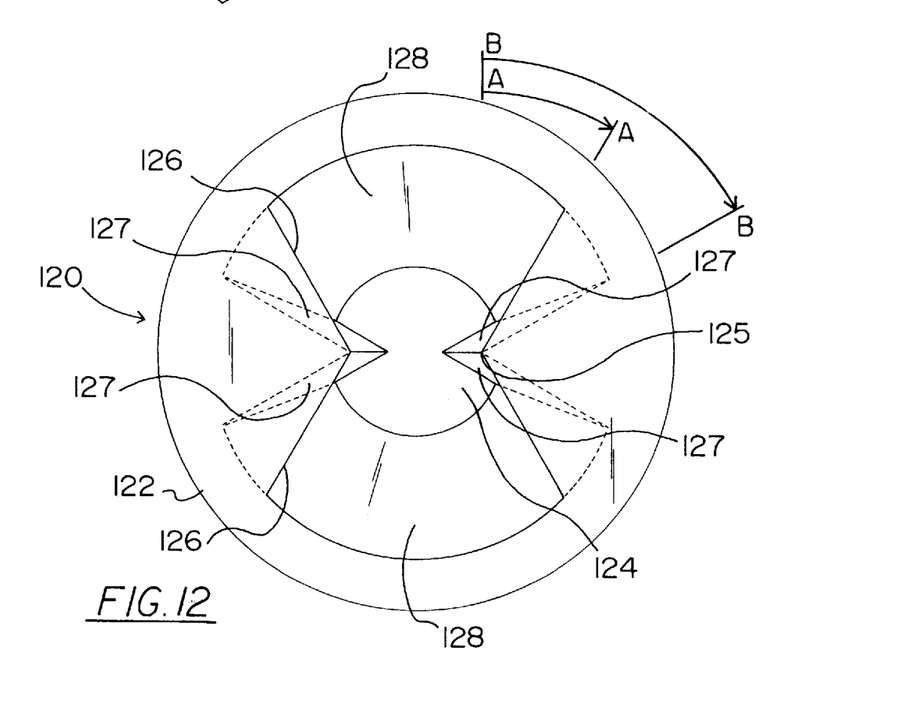
FIG. 12 is a top view of the screw head of the second embodiment of the present invention.

A second embodiment of the present invention is illustrated in FIGS. 7 through 12. The second embodiment comprises a screw 120 and a driver 130 therefore. As best illustrated in FIGS. 10 through 12, the screw 120 has a tapered head 122 with an hourglass-shaped driver receiving cavity 124. The hourglass-shaped driver receiving cavity 124 includes a middle section 125 and a pair of opposed wedge-shaped sections 126 extending from the middle section 125. The pair of opposed wedge-shaped sections 126 expand radially outward from the middle section 125 at a first angle AA. The pair of opposed wedge-shaped sections 126 each have undercut and tapered sidewalls 127 and have open and tapered sidewalls 128. The undercut and tapered sidewalls 127 expand radially outward from the middle section 125 at a second angle BB which is greater than the first angle AA, thereby creating "neutral" and "locked-in" positions. The undercut and tapered sidewalls 127 and the open and tapered sidewalls 128 taper inward.

As best illustrated in FIGS. 7 through 10, the driver 130 comprises a handle 132 and a tool element 134 extending from the handle 132. The tool element 134 has an hourglass-shaped end 136 distal from the handle 132. The hourglass-shaped end 136 of the tool element 134 has a tapered inner shoulder surface 137, an upper shoulder surface 138, and a tapered outer shoulder surface 139. The tapered inner shoulder surface 137 and the tapered outer shoulder surface 139 taper inward.

The hourglass-shaped end 136 cooperably engages the hourglass-shaped driver receiving cavity 124 of the tapered head 122 of the screw 120 whereby the tapered outer shoulder surface 139 abuts the open and tapered sidewalls 128 when the driver 130 and the screw 120 are in a "neutral" working engagement. The tapered inner shoulder surface 137 and the upper shoulder surface 138 cooperably engage and lockingly mate with the undercut and tapered sidewalls 127 of the pair of opposed wedge-shaped sections 126 when the driver 130 and the screw 120 are in a "locked-in" working engagement, thereby securing the driver 130 to the tapered head 122 of the screw 120. The hourglass-shaped driver receiving cavity 124 of the tapered head 122 of the screw 120 and the hourglass-shaped end 136 of the tool element 134 can be formed in the shape of an "X" or a "Figure 8."

In use, the hourglass-shaped end 36 of the tool element 34 of the driver 30 is inserted into the hourglass-shaped driver receiving cavity 24 of the head 22 of the screw 20, whereby the outer shoulder surface 39 abuts the open sidewalls 28 thereby resulting in a "neutral" working engagement. The handle 32 of the driver 30 is rotated in one direction relative to the screw 20, thus the hourglass-shaped end 36 of the tool element 34 is correspondingly rotated into the undercut sidewalls 27 of the pair of opposed wedge-shaped sections 26. The inner shoulder surface 37 and the upper shoulder surface 38 of the hourglass-shaped end 36 mate with the undercut sidewalls 27, thus securely mating the driver 30 and the screw 20 and thereby resulting in a "locked-in" working engagement. Thus, the screw 20 can be easily guided into a hole or removed from a hole while being retained on the driver 30.

Once the screw 20 is inserted or removed from a hole, the handle 32 of the driver 30 is rotated in an opposite direction relative to the screw 20, whereby the hourglass-shaped end 36 of the tool element 34 is correspondingly rotated out of the undercut sidewalls 27 of the pair of opposed wedge-shaped sections 26, thereby returning to a "neutral" working engagement. The hourglass-shaped end 36 of the tool element 34 of the driver 30 may then be removed from the hourglass-shaped driver receiving cavity 24 of the head 22 of the screw 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A screw and driver system comprising:
    a screw having a head with an hourglass-shaped driver receiving cavity;
    a driver comprising a handle and a tool element extending from said handle, said tool element having an hourglass-shaped end distal from said handle, said hourglass-shaped end cooperably engaging said hourglass-shaped driver receiving cavity of said head of said screw when said driver and said screw are in working engagement;
    wherein said hourglass-shaped driver receiving cavity of said head of said screw includes a middle section and a pair of opposed wedge-shaped sections extending from said middle section;
    each of said pair of opposed wedge-shaped sections expanding radially outward from said middle section at a first angle; and
    each of said pair of opposed wedge-shaped sections having a substantially vertical undercut sidewall and an open sidewall, said undercut sidewall expanding radially outward from said middle section at a second angle, said second angle being larger than said first angle.

2. The screw and driver system of claim 1, wherein said hourglass-shaped end of said tool element has an inner shoulder surface, an upper shoulder surface, and an outer shoulder surface,
    said outer shoulder surface abutting said open sidewall, and said inner shoulder surface and said upper shoulder surface cooperably engaging and lockingly mating with said undercut sidewall when said driver and said screw are in working engagement.

3. The screw and driver system of claim 1, wherein said hourglass-shaped driver receiving cavity of said head of said screw and said hourglass-shaped end of said tool element are substantially in the shape of an "X."

4. The screw and driver system of claim 1, wherein said hourglass-shaped driver receiving cavity of said head of said screw and said hourglass-shaped end of said tool element are substantially in the shape of a "Figure 8."

5. A screw and driver system comprising:
    a screw having a head with an hourglass-shaped driver receiving cavity;
    a driver comprising a handle and a tool element extending from said handle, said tool element having an hourglass-shaped end distal from said handle, said hourglass-shaped end cooperably engaging said hourglass-shaped driver receiving cavity of said head of said screw when said driver and said screw are in working engagement;
    wherein said hourglass-shaped driver receiving cavity of said head of said screw includes a middle section and a pair of opposed wedge-shaped sections extending from said middle section;
    each of said pair of opposed wedge-shaped sections expanding radially outward from said middle section at a first angle;
    each of said pair of opposed wedge-shaped sections having an undercut and tapered sidewall and having an open and tapered sidewall, said undercut and tapered sidewall expanding radially outward from said middle section at a second angle, said second angle being larger than said first angle; and
    wherein said undercut sidewall and said open sidewall tapers outwardly approaching an upper portion of said pair of opposed wedge-shaped sections; and
    wherein the hourglass-shaped end of said tall element is similarly tapered with respect to said driver receiving cavity for causing said hourglass-shaped end of said tool element to move to a center position when said end is inserted in said driver receiving cavity.

6. The screw and driver system of claim 5, wherein said hourglass-shaped end of said tool element has a tapered inner shoulder surface, an upper shoulder surface, and a tapered outer shoulder surface,
    said tapered inner shoulder surface and said tapered outer shoulder surface each tapering inward,
    said tapered outer shoulder surface abutting said open and tapered sidewall, and said tapered inner shoulder surface and said upper shoulder surface cooperably engaging and lockingly mating with said undercut and tapered sidewall when said driver and said screw are in working engagement.

7. The screw and driver system of claim 1, further comprising:

the head having a continuous perimeter wall surrounding said cavity for blocking lateral movement of the end of the tool element when said end is positioned in said cavity.

8. The screw and driver system of claim 5, further comprising:

the head having a continuous perimeter wall surrounding said cavity for blocking lateral movement of the end of the tool element when said end is positioned in said cavity.

Figure 8:
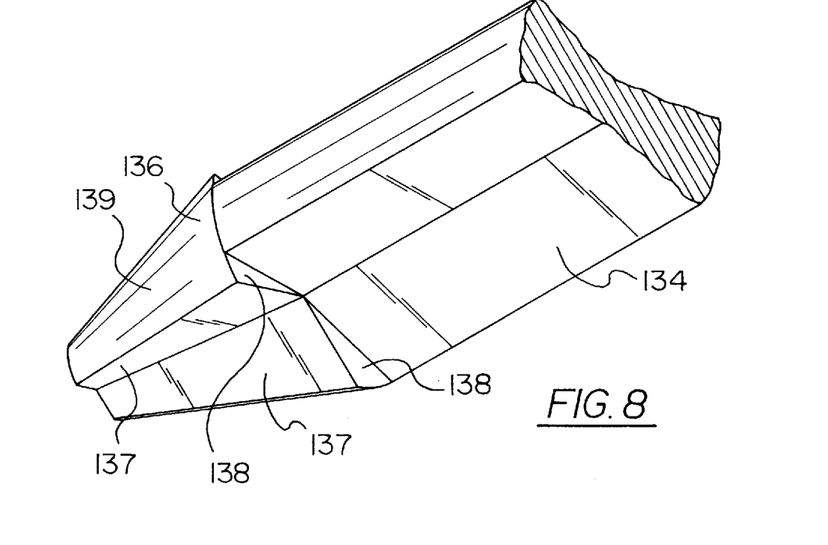
FIG. 8 is an enlarged isometric illustration of the tool element and end of the driver of the second embodiment of the present invention.
Figure 9:
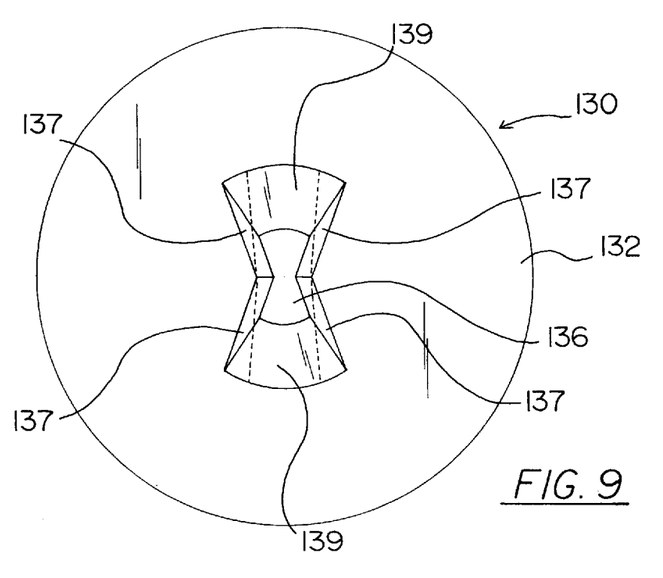
FIG. 9 is an end view of the driver of the second embodiment of the present invention.

9. A screw and driver system comprising:

a screw having a head with an hourglass-shaped driver receiving cavity;

a driver comprising a handle and a tool element extending from said handle, said tool element having an hourglass-shaped end distal from said handle, said hourglass-shaped end cooperably engaging said hourglass-shaped driver receiving cavity of said head of said screw when said driver and said screw are in working engagement;

wherein said hourglass-shaped driver receiving cavity of said head of said screw includes a middle section and a pair of opposed wedge-shaped sections extending from said middle section;

each of said opposed wedge-shaped sections expanding radially outward from said middle section at a first angle; and each of said opposed wedge-shaped sections having a substantially vertical undercut sidewall and an open sidewall, said undercut sidewall expanding radially outward from said middle section at a second angle, said second angle being larger than said first angle;

wherein said hourglass-shaped end of said tool element has an inner shoulder surface, an upper shoulder surface, and an outer shoulder surface, said outer shoulder surface abutting said open sidewall, and said inner shoulder surface and said upper shoulder surface cooperably engaging and lockingly mating with said undercut sidewall when said driver and said screw are in working engagement;

wherein said hourglass-shaped driver receiving cavity of said head of said screw and said hourglass-shaped end of said tool element are substantially in the shape of an "X";

wherein said hourglass-shaped driver receiving cavity of said head of said screw and said hourglass-shaped end of said tool element are substantially in the shape of a "Figure 8"; and the head having a continuous perimeter wall surrounding said cavity for blocking lateral movement of the end of the tool element when said end is positioned in said cavity.

* * * * *